United States Patent [19]
Kessler

[11] Patent Number: 5,592,747
[45] Date of Patent: Jan. 14, 1997

[54] PORTABLE PRECISION INDICATOR GAGE

[76] Inventor: Dennis B. Kessler, 1084 Florida La., Elk Grove Village, Ill. 60007

[21] Appl. No.: 369,697

[22] Filed: Jan. 6, 1995

[51] Int. Cl.$^6$ ................................................ G01B 5/12
[52] U.S. Cl. ..................... 33/783; 33/803; 33/542; 33/558.01
[58] Field of Search .................. 33/783, 784, 791, 33/792, 793, 794, 797, 798, 799, 800, 801, 803, 804, 807, 808, 542, 555.1, 558.01, 558.04, 558.05, 558.2, 558.3, 558.4, 572

[56] References Cited

U.S. PATENT DOCUMENTS

| | | | |
|---|---|---|---|
| 2,805,481 | 9/1957 | Locke, Sr. | 33/792 |
| 2,849,797 | 9/1958 | Etchell | 33/804 |
| 4,128,943 | 12/1978 | Muhlethaler | 33/803 |
| 4,586,261 | 5/1986 | Beaupère | 33/803 |

*Primary Examiner*—Christopher W. Fulton

[57] ABSTRACT

A portable precision indicator gage for measuring the distance between two contact points. The portable gage is adapted to receive an indicator device for indicating a dimension of an object corresponding to a distance between two contact points having a movable indicator pin defining one of the contact points. The portable gage has a tubular housing including a radial surface having a port for facilitating viewing of an indicator device and a proximal end portion, and spaced axially therefrom a distal end portion. An end cap is connected to the proximal end portion having an end port adapted to receive a movable indicator pin therethrough, including an anchor pin extending outwardly therefrom. The movable indicator pin and the anchor pin define a first and a second contact point, respectively. And, an adjustment mechanism is provided for adjusting the distance between the contact points, and is connected to the housing.

17 Claims, 3 Drawing Sheets

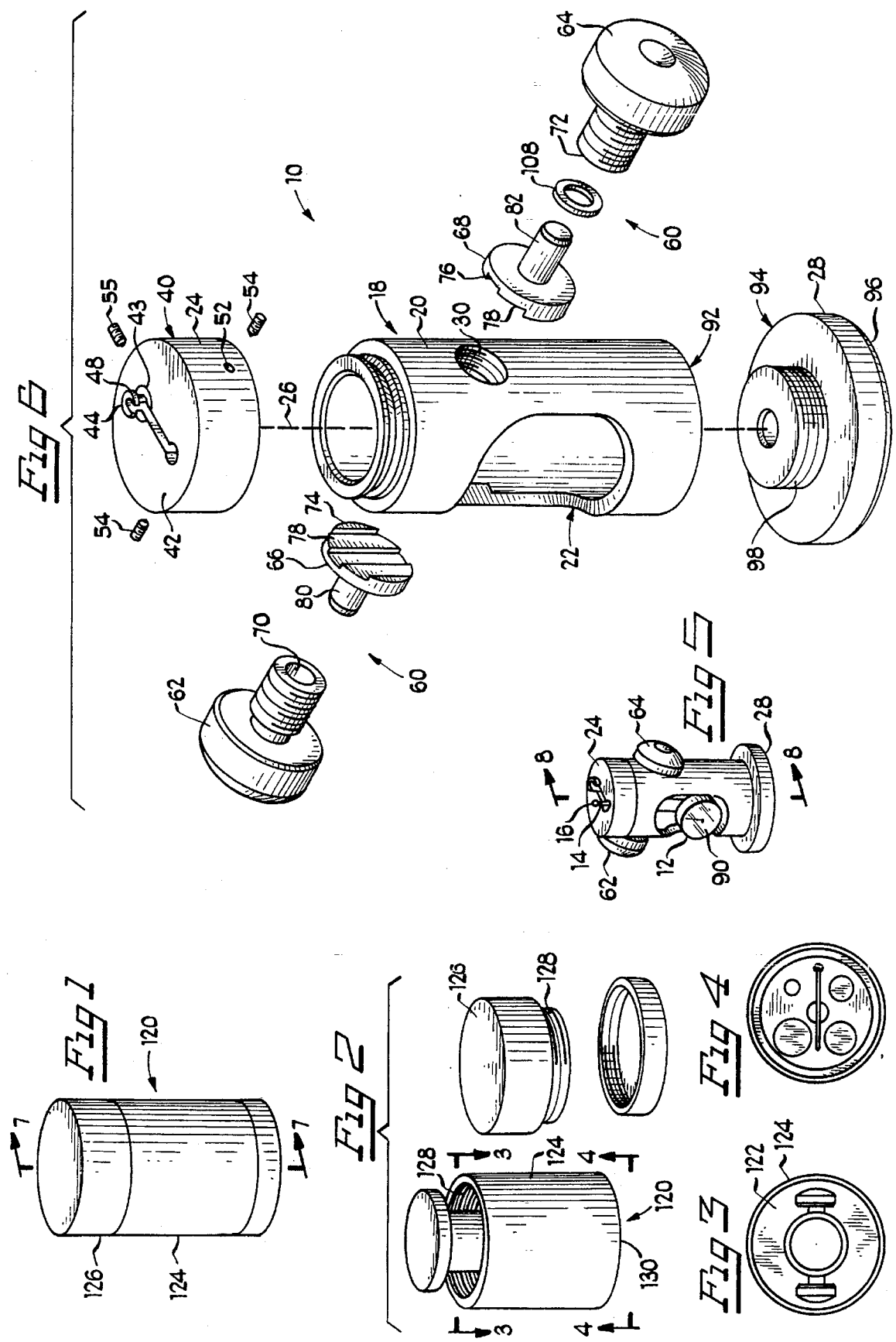

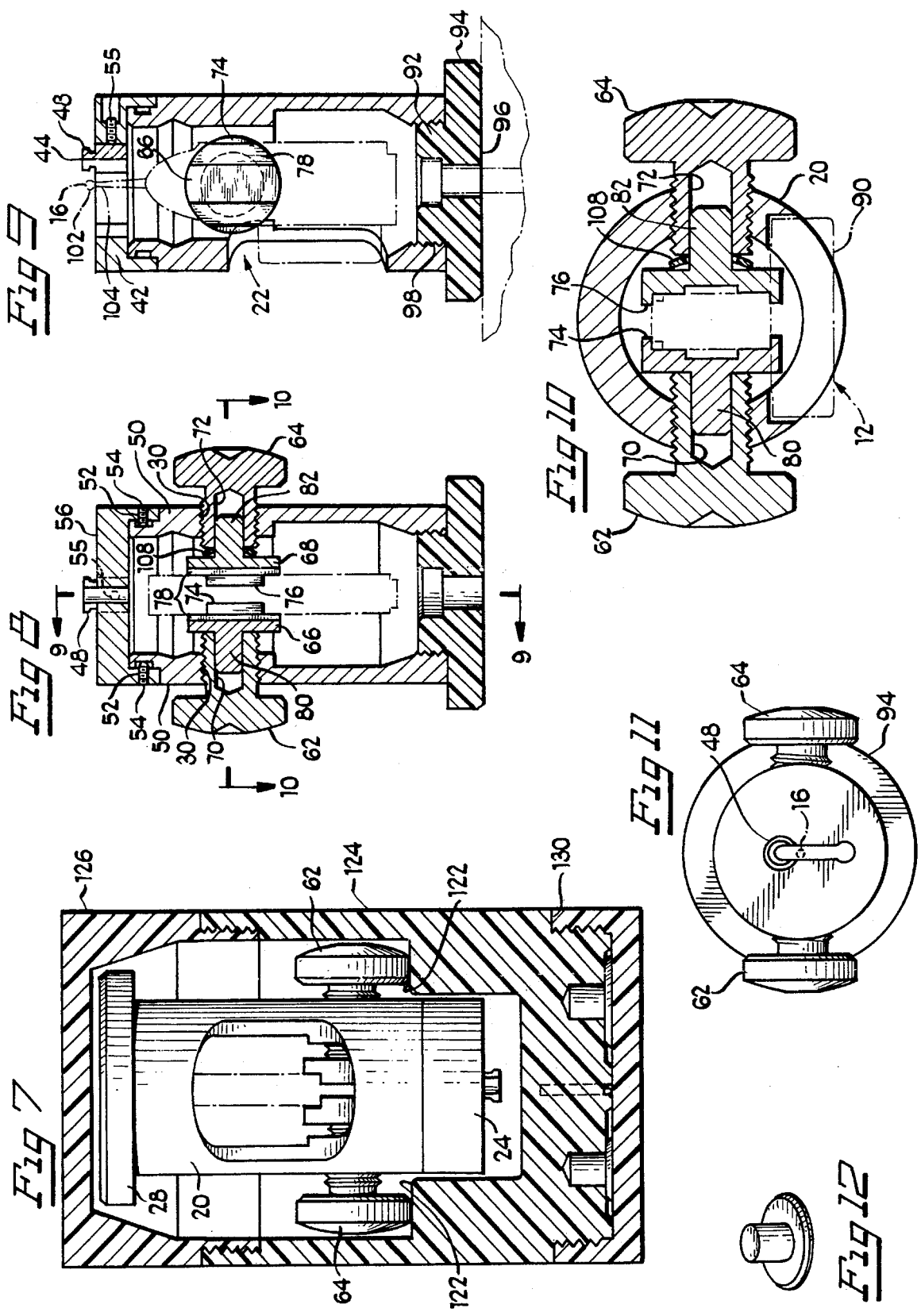

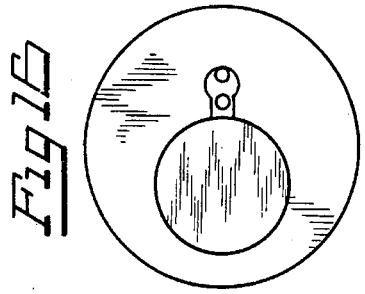
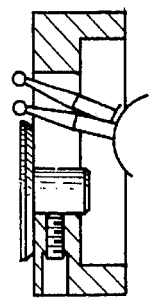
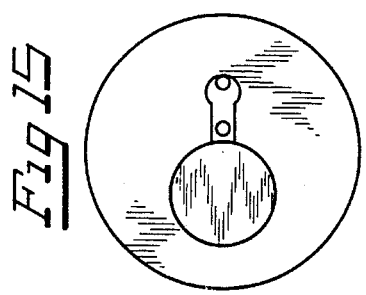
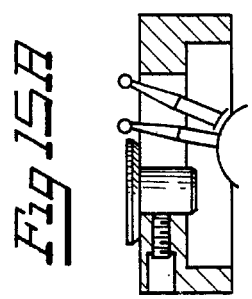
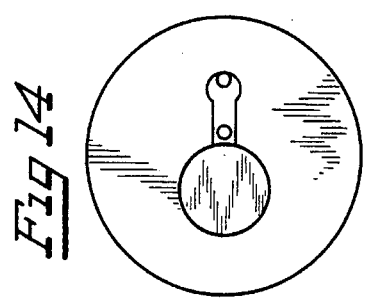
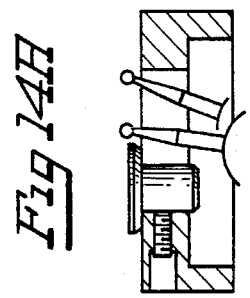
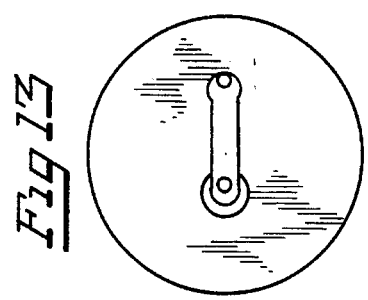
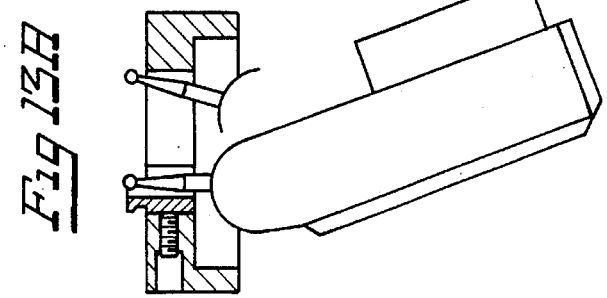

5,592,747

PORTABLE PRECISION INDICATOR GAGE

FIELD OF THE INVENTION

This invention relates to gages and more particularly, to a portable precision indicator gage for measuring the distance between two contact points.

BACKGROUND OF THE INVENTION

Certain styles of gages are commonly referred to as so called "diameter gages," and are generally designed for comparing the relative distances between two points of a calibrated object, and corresponding points on an object being produced. These distances can pertain to diameters of bores or face groove journals, but can also be used to measure parallel surfaces, such as slots, keyways and the like.

The normal use of a diameter gage is hand held. Such gages can be placed against a surface that is perpendicular to the diameter or slot being measured. Gages can also be useful on machines such as internal or jig grinders, horizontal or vertical maching centers and jig borers as well as honing machines.

It would be an improvement in the art to provide a versatile, portable and accurate measuring gage. During lathing operations, such a device could facilitate inspection of a diameter while the part is still in the machine or outside of the machine, as desired. This sequence could also be used to inform the operator if the device holding the part has induced any distortions, or if the diameter has become out of round, after removal from the machine.

It would be an improvement in the art, to provide a versatile, compact, lightweight, easily adjustable, hand-held and accurate gage for any and all such gage uses and applications.

SUMMARY OF THE INVENTION

A portable precision indicator gage for measuring the distance between two contact points. The portable gage is adapted to receive an indicator device for indicating a dimension of an object corresponding to a distance between two contact points having a movable indicator pin defining one of the contact points. The portable gage has a tubular housing including a radial surface having a port for facilitating viewing of an indicator device and a proximal end portion, and spaced axially therefrom a distal end portion. An end cap is connected to the proximal end portion having an end port adapted to receive a movable indicator pin therethrough, including an anchor pin extending outwardly therefrom. The movable indicator pin and the anchor pin define a first and a second contact point, respectively. And, an adjustment mechanism is provided for adjusting the distance between the contact points, and is connected to the housing.

BRIEF DESCRIPTION OF THE DRAWINGS

FIG. 1 is an elevated perspective view of a three piece tubular case adapted to receiving a portable precision indicator gage, in accordance with the present invention.

FIG. 2 is an elevated perspective view of an open top tubular case adapted to receive a portable precision indicator gage, with a top and a bottom of the case removed from a body, in accordance with the present invention.

FIGS. 3 and 4 are elevated plan views along lines 3—3 and 4—4 of FIG. 2, showing the portable precision indicator gage in the case in FIG. 3 and accesory anchor pins in FIG. 4, in accordance with the present invention.

FIG. 5 is an elevated perspective view of the portable precision indicator gage shown standing upright with an indicator installed, in accordance with the present invention.

FIG. 6 is an elevated perspective and exploded view of the portable precision indicator gage without an indicator installed, in accordance with the present invention.

FIG. 7 is a front sectional view along the lines 7—7 of FIG. 1, in accordance with the present invention.

FIG. 8 is a front sectional view along the lines 8—8 of FIG. 5, showing the portable precision indicator gage, in accordance with the present invention.

FIG. 9 is a side-sectional view through lines 9—9 of FIG. 8, showing the portable precision indicator gage, in accordance with the present invention.

FIG. 10 is an enlarged, plan section view through lines 10—10 of FIG. 8, showing the portable precision indicator gage, in accordance with the present invention.

FIG. 11 is a plan top view of the portable precision indicator gage in FIG. 5, in accordance with the present invention.

FIG. 12 is a lower perspective view of one of the anchor pins in FIG. 4 of the portable precision indicator gage, in accordance with the present invention.

FIGS. 13, 14, 15, and 16 are partial top views of the cap for the portable precision indicator gage in FIG. 5, showing four removable anchor pins with progressively larger head diameters, in accordance with the present invention.

FIGS. 13A, 14A, 15A and 16A are cross-sectional views of the caps in FIGS. 13, 14, 15 and 16, respectively showing various pivotably adjustable positions of the indicator device amd indicator pin in FIG. 5, in accordance with the present invention.

DESCRIPTION OF THE PREFERRED EMBODIMENT

As illustrated in the figures, a portable (compact) precision indicator gage 10 is shown. The indicator gage 10 is used for measuring the distance between two contact points, and is particularly adapted to receive an indicator device 12 with a face, for indicating a dimension of an object corresponding to a distance between two contact points having a movable (pivotable) indicator pin 14 defining one of the contact points 16, in FIG. 5.

In its simplest form, the indicator gage 10 includes a tubular housing 18 including a radial surface 20 having an oblong (oval) port 22 for facilitating viewing of an indicator device 12 having a gage face 90. The tubular housing 18 further includes a proximal end portion 24 and spaced axially therefrom a distal end portion or base 28. The axial axis is shown in dashed line as item 26 in the drawings. The indicator gage 10 also has a removable end cap 40 connected to the proximal end portion 24 having an oblong end port 42 adapted to receive a movable indicator pin 14 therein and therethrough. The end cap 40 includes a replaceable anchor pin 44 extending outwardly therefrom. The movable indicator pin 14 and the anchor pin 44 define a first and a second contact point 16 and 48, respectively. And, the indicator gage 10 includes an adjustment mechanism 60 for adjusting the distance between the contact points 16 and 48, which is operably connected to the housing 18. As shown in the drawings, the adjustment mechanism 60 is preferably, pivotably connected to a middle portion of the housing 18, for optimal viewing of the indicator 12 and simplified adjustment of it as well.

This indicator gage 10 provides a hand-held, compact and portable measuring device which is very accurate for predetermined small distances. The gage 10 is particularly adapted to measuring inner diameters of about two inches or less, and preferably about 0.18 to about 1 inch, as illustrated in FIGS. 13–16.

However, as should be understood by those skilled in the art, various components of the invention can be modified to increase or decrease the range and capacity of the gage. For example, the interchangeable anchor pins of different sizes can increase the versatility of the gage. Further, the tubular housing can be made larger to receive electronic style indicators, and the end cap can be enlarged, modified or configured with extenders, for example.

Another advantage of the invention, is its light weight, compact size and configuration adapted to fit in the palm of an operators hand. This can facilitate single-handed operations.

Yet another advantage is that consistant measurements can be obtained by experienced or novice users with this gage. In contrast, micrometers and verniers can result in inconsistant measurements and readings depending on the pressure applied. And, the light contact pressure of the moveable indicator pin, minimizes distortions induced by the gage when measuring thin wall parts.

The tubular housing 18 includes an oblong port 22 for facilitating viewing or a gage face 90 of the indicator device 12. This structure provides a wide and visible opening (or window) for improved viewing the gage face 90. Stated another way, the housing 18 creates a housing that protects the internal indicator, yet includes an oblong port 22 for facilitating viewing of the indicator gage face 90.

The housing 18 includes a threadable opening 92 at the distal end portion 28 for receiving a stand structure 94. The stand structure 94 is connected to the distal end portion 28 and includes a substantially planar surface 96 for standing the indicator gage 10 in an upright position, without disturbing a preset gage setting (of the distance between the first and second contact points 16 and 48). Advantageously, the opening 92 at the distal end portion 28 and stand structure 94 are threadably connected, indicated as item 98, for ease of coupling and decoupling.

More particularly, they can be complimentarily configured to facilitate connection of the indicator gage 10 with a stationary stand on a table, such as, for high volume (repetitive measurements) by, for example, a machinist, quality control technition or in a lab. In a preferred embodiment, a port 100 is used to facilitate connection to a table or the like, for secure anchoring when taking repetitive measurements.

More particularly, the planar surface 96 and port 100 can facilitate table mounting. For example, a socket head cap screw can be used to fasten the stand structure 94 to a table or similar surface. The housing 18 can then be re-attached, to allow a secure instrument, in a hands-free environment.

During the setting process of the gage, access to the back end of the indicator 12 is provided by removing the stand structure 94 from the housing 18. The indicator 12 can then be moved axially or radially, as appropriate. In a preferred embodiment, a rear port 32 opposite the front port 22, provides access to the indicator for simplified axial and radial setting and adjustment, as shown in FIGS. 8 and 9.

The housing 18 can have opposing radial openings 30, adapted for receiving at least part of the adjustment mechanism 60. This structure facilitates initial setup and subsequent adjustment of the indicator 12. The housing 18 is adapted to receive and protect many of the adjustment mechanisms, and be holdable in the palm of an operators hand.

The end cap 40 can include an outwardly extending axial flange 50 with radial openings 52 adapted to receive set screws 54, for securely coupling the end cap 40 to the proximal end portion 24 of the housing 18. Stated another way, a portion of the housing 18 and end cap are complimentarily configured and adapted to facilitate interconnection of the housing 18 and end cap 40.

The surface 56 provides a main face which establishes a plane. The anchor pin 44 is insertable therein creating a stationary second contact point 48. A lever type indicator, such as that shown in FIG. 5, as item 12, has a lever and contact ball passing through the face through port 42, creating the moveable first contact point 16.

As best shown in FIGS. 13A–16A, a set screw 55 is shown which allows the anchor pins to be replaced and coupled, as desired. Advantageously, anchor pins with varing head diameters, shown as items 110, 112, 114 and 116, can be used in this invention. This structure provides improved versatility in that any inside diameter can be measured up to a predetermined distance. Thus, in this invention only one indicator 10 is necessary to measure over a wide range of about one inch or less. In contrast, Applicant is not aware of any prior art portable gages that allow such a wide measuring range of inner diameters, which is very accurate, such as this invention.

The end cap 40 includes an oblong end port or keyhole (or elongated slot) 42, along a center line, substantially in alignment with the axial axis 26, for adjustment of the pivot pin 14 with respect to the anchor pin 44. In one embodiment, at one end of the oblong end port 42 is a partially round hole section 43, complementarily configured and adapted to receive a replaceable (removable) anchor pin 44. Advantageously, various lengths of anchor pins can be used as appropriate in hole section 43.

In one embodiment, a set screw 55 is threadably received in a port of the cap 40, to securely attach the anchor pin 44 to the end cap 40. The distance between the head portion 102 and planar surface 56 can be adjusted by use of the set screw 55, for more accurate readings. Improved accuracy in readings are usually obtained when the head portion 102 (second contact point) and the first contact point 16 are substantially in the same plane, or the same distance from the planar surface 56. Thus, this set screw 55 provides greater versatility and more accurate readings, especially when the contacts points are substantially in the same plane or distance away from the outer, planar surface 56 of the end cap 40, substantially as shown in FIG. 9.

The anchor pin 44 includes a head portion 102 (defining the second contact point 48) located away from the end cap 40 having a larger diameter than a neck portion 104 adjacent to the end cap 40, the head portion 102 defining the second contact point 48, for more accurate readings, as best shown in FIGS. 9 and 12.

The adjustment mechanism 60 includes at least one knob 62 (or 64) for adjusting and securing the position of the movable pin 14 with respect to the anchor pin 44. In a preferred embodiment, the adjustment mechanism 60 includes clamping devices 66 and 68 operably connected to knobs 62 and 64, for allowing the depth of the pivot pin 14 to be adjusted substantially axially, as shown by item 26 (defined as in a direction substantially perpendicular to the end cap 40), radially (defined as a direction substantially parallel to the end cap 40) or both.

The adjusting mechanism 60 shown in the figures, and as best shown in FIG. 6, includes two knobs 62 and 64 spaced radially and in mirror image from each other, and each having bores 70 and 72 running at least partially through them, for receiving clamps 66 and 68, respectively. The clamps 66 and 68 can include inwardly facing surfaces 74 with channel sections 78 adapted to adjustably receive, hold and straddle, at least part of an indicator device 12. The middle channel sections 79, as shown in FIG. 10, provide minimal the possibility of damage to the inner components in indicator device 12. The clamps 66 and 68 are spaced radially and are in mirror image with respect to each other.

The adjustment mechanism 60 includes clamps 66 and 68 each including inwardly facing surfaces 74 with a channel section 78 and outwardly extending pilot portions 80 and 82 complimentarily configured to be received in the bores 70 and 72 of knobs 62 and 64, respectively. The adjustment mechanism 60 is adapted to straddle the indicator device 12 for facilitating pivotable adjustment thereof. The indicator device 12 is compressively and adjustably connected to the housing 18 via the adjustment mechanism 60.

The adjustment mechanism 60 includes at least one concave compression washer 108 connected between knob 64 and clamp 68, for applying a positive resistance when setting or adjusting the movable indicator pin 14 with respect to the anchor pin 44. The compression washer 108 maintains some resistance during adjustment, yet allows suitable movement for facilitating setting and adjustment of the pin 14 with respect to the anchor pin 44.

In use, depending on the accuracy required, micrometers or verniers can be used to set the gage for course tolerances, previously calibrated parts can be used for moderate tolerances and master rings or stacked gage blocks can be used for tight tolerances.

The invention further includes an open-top and substantially tubular case 120 adapted to receive the indicator gage 10. The case can include an inner ledge 122 in proximity to a bottom portion 130, to support the adjustment mechanism 60 free from touching the contact points 16 and 48. The case 120 includes a body 124 and top and bottom portions (or caps) 126 and 127, threadably-couplable to the body 124 by threads 128 and 129, respectively. The case 120 is adapted to receive, protect and enclose the indicator gage 10 therein during storage, transport or the like. It also is complementarily configured to receive various replaceable anchor pins with various diameter heads 110, 112, 114 and 116 in an intermediate section 132, with receptacles 134. A middle receptacle can securely hold a removable allen wrench 136, for adjusting set screws 54 and 55, as desired.

The three piece case is integral to the gage. When closed, it provides security and protection against damage. When the top is removed, the center section provides a resting place between measurements. This contributes to keeping the gage in calibration. And, in a lower section of the case, under a seperate cap, a compartment for holding additional accesories is provided.

Although the present invention has been described with reference to certain preferred embodiments, numerous modifications and variations can be made by those skilled in the art without departing from the novel spirit and scope of this invention.

That which is claimed is:

1. A portable precision indicator gage for measuring a distance between two contact points, and adapted to receive an indicator device for indicating a dimension of an object corresponding to the distance between two contact points having a movable indicator pin defining one of the contact points, comprising;

a tubular housing including a radial surface having a port for facilitating viewing of an indicator device and a proximal end portion and spaced axially therefrom a distal end portion;

an end cap connected to the proximal end portion having an end port adapted to receive a movable indicator pin therethrough, including an anchor pin extending outwardly therefrom, the movable indicator pin and the anchor pin defining a first and a second contact point, respectively; and an adjustment mechanism for adjusting the distance between the contact points, substantially pivotably connected to the housing, the adjustment mechanism includes at least one clamping device operably connected to a knob for allowing the pivot pin to be adjusted, substantially axially defined as in a direction substantially perpendicular to the end cap, substantially radially defined as in a direction substantially parallel to the end cap, substantially both axially and radially, or substantially held stationary with respect to the anchor pin.

2. The portable precision indicator gage of claim 1, wherein the port of the tubular housing is oval shaped for facilitating viewing of a gage face of an indicator device.

3. The portable precision indicator gage of claim 1, wherein the housing includes an opening at the distal end for receiving a stand structure, the stand structure is connected to the distal end and includes a planar surface for standing the indicator upright without disturbing the gage setting defined as the distance between the first and second contact points.

4. The portable precision indicator gage of claim 3, wherein the opening at the distal end and stand structure are threadably connected together.

5. The portable precision indicator gage of claim 1, wherein the housing has two opposing radial openings in a middle portion, for receiving the adjustment mechanism.

6. The portable precision indicator gage of claim 1, wherein the end cap includes an axial flange with openings adapted to receive set screws for securely coupling the end cap to the housing.

7. The portable precision indicator gage of claim 1, wherein the anchor pin includes a head portion located away from the end cap which is larger in diameter than a neck portion adjacent to the end cap, the head portion defining the second contact point.

8. The portable precision indicator gage of claim 1, wherein the adjustment mechanism includes the knob for adjusting and securing the position of the movable pin with respect to the anchor pin.

9. The portable precision indicator gage of claim 1, wherein the adjusting mechanism includes a plurality of knobs having bores running at least partially through them for receiving a plurality of clamps.

10. The portable precision indicator gage of claim 9, wherein the clamps include inwardly facing surfaces with channels adapted to adjustably receive at least part of an indicator device having a face viewable through the port.

11. The portable precision indicator gage of claim 1, wherein the adjusting mechanism includes the at least one clamp including an inwardly facing surface with a channel and an outwardly extending pilot portion complimentarily configured to be received in the knob of the adjustment mechanism having a bore section.

12. The portable precision indicator gage of claim 11, wherein the adjusting mechanism includes at least one compression washer connected between the clamp and the knob for applying at least some resistance when setting or adjusting the movable indicator pin.

13. The portable precision indicator gage of claim 1, further comprising an open top tubular case adapted to receive the gage.

14. The portable precision indicator gage of claim 13, wherein the case includes an inner ledge to support the adjusting means such that the contact points are substantially free from touching the case.

15. The portable precision indicator gage of claim 13, wherein the case includes a body and top threadably-coupled together.

16. A case and portable precision indicator gage for measuring a distance between two contact points, and adapted to receive an indicator device for indicating a dimension of an object corresponding to the distance between two contact points having a movable indicator pin defining one of the contact points, comprising:

a tubular housing including a radial surface having a port for facilitating viewing of an indicator device and a proximal end portion and spaced axially therefrom a distal end portion;

an end cap connected to the proximal end portion having an end port adapted to receive a movable indicator pin therethrough, including an anchor pin extending outwardly therefrom, the movable indicator pin and the anchor pin defining a first and a second contact point, respectively; and an adjustment mechanism for adjusting the distance between the contact points, substantially adjustably connected to the housing, the adjustment mechanism including at least one knob for adjusting and securing the position of the movable pin with respect to the anchor pin; and an open top tubular case adapted to receive the gage, the tubular case includes an inner ledge to support the adjusting means such that the contact points are substantially free from touching the case.

17. The case and portable precision indicator gage of claim 16, wherein the case includes a lower intermediate compartment adapted to receive gage accesories.

* * * * *